(12) United States Patent
Rice

(10) Patent No.: US 6,402,100 B1
(45) Date of Patent: Jun. 11, 2002

(54) ERGONOMIC LOWER ARM SUPPORT REST

(76) Inventor: Gregory H. Rice, 4351 Forest Ave. SE., Mercer Island, WA (US) 98040

( * ) Notice: Subject to any disclaimer, the term of this patent is extended or adjusted under 35 U.S.C. 154(b) by 0 days.

(21) Appl. No.: 08/798,754

(22) Filed: Feb. 13, 1997

(51) Int. Cl.$^7$ ................................................ B68G 5/00
(52) U.S. Cl. ...................................... 248/118; 248/918
(58) Field of Search ............................. 248/118, 118.1, 248/118.3, 918, 118.5; 400/715; D16/130, 131, 132; 298/118.9, 118

(56) References Cited

U.S. PATENT DOCUMENTS

| | | | |
|---|---|---|---|
| 4,862,165 A | * 8/1989 | Gart | 341/20 |
| 4,973,176 A | * 11/1990 | Dietrich | 400/715 |
| 5,004,196 A | * 4/1991 | Gross | 248/118.3 |
| 5,088,668 A | * 2/1992 | Grimm | 248/118.3 |
| 5,161,760 A | * 11/1992 | Terbrack | 248/118 |
| 5,170,971 A | * 12/1992 | Schaeffer et al. | 248/118.1 |
| 5,197,699 A | * 3/1993 | Smith et al. | 248/118 |
| 5,203,527 A | * 4/1993 | Rubey | 248/118 |
| 5,340,067 A | * 8/1994 | Martin et al. | 248/118.5 |
| 5,398,896 A | * 3/1995 | Terbrack | 248/118.5 |
| 5,405,109 A | * 4/1995 | Nordnes | 248/118.3 |
| 5,433,407 A | * 7/1995 | Rice | 248/118.1 |
| 5,470,036 A | * 11/1995 | Vu et al. | 248/118.5 |
| 5,490,647 A | * 2/1996 | Rice | 248/118.1 |
| 5,562,270 A | * 10/1996 | Montague | 248/118.1 |
| 5,845,884 A | * 12/1998 | Terbrack | 248/118 |

* cited by examiner

*Primary Examiner*—Ramon O. Ramirez
*Assistant Examiner*—Tan Le
(74) *Attorney, Agent, or Firm*—Davis Wright Tremaine LLP

(57) ABSTRACT

An ergonomic lower arm sususpension for use in repetitive hand movements when working with a work piece. The repetitive movements can be, for example, use of a data entry device such as a keyboard, a computer mouse, a ten-key adding machine, small parts assembly, and the like. The responsiveness of the lower arm suspension enables the device to follow the limited working movement of the hand while supporting correct ergonomic posture, and may either be stationary during use or may move about the work surface during use.

9 Claims, 10 Drawing Sheets

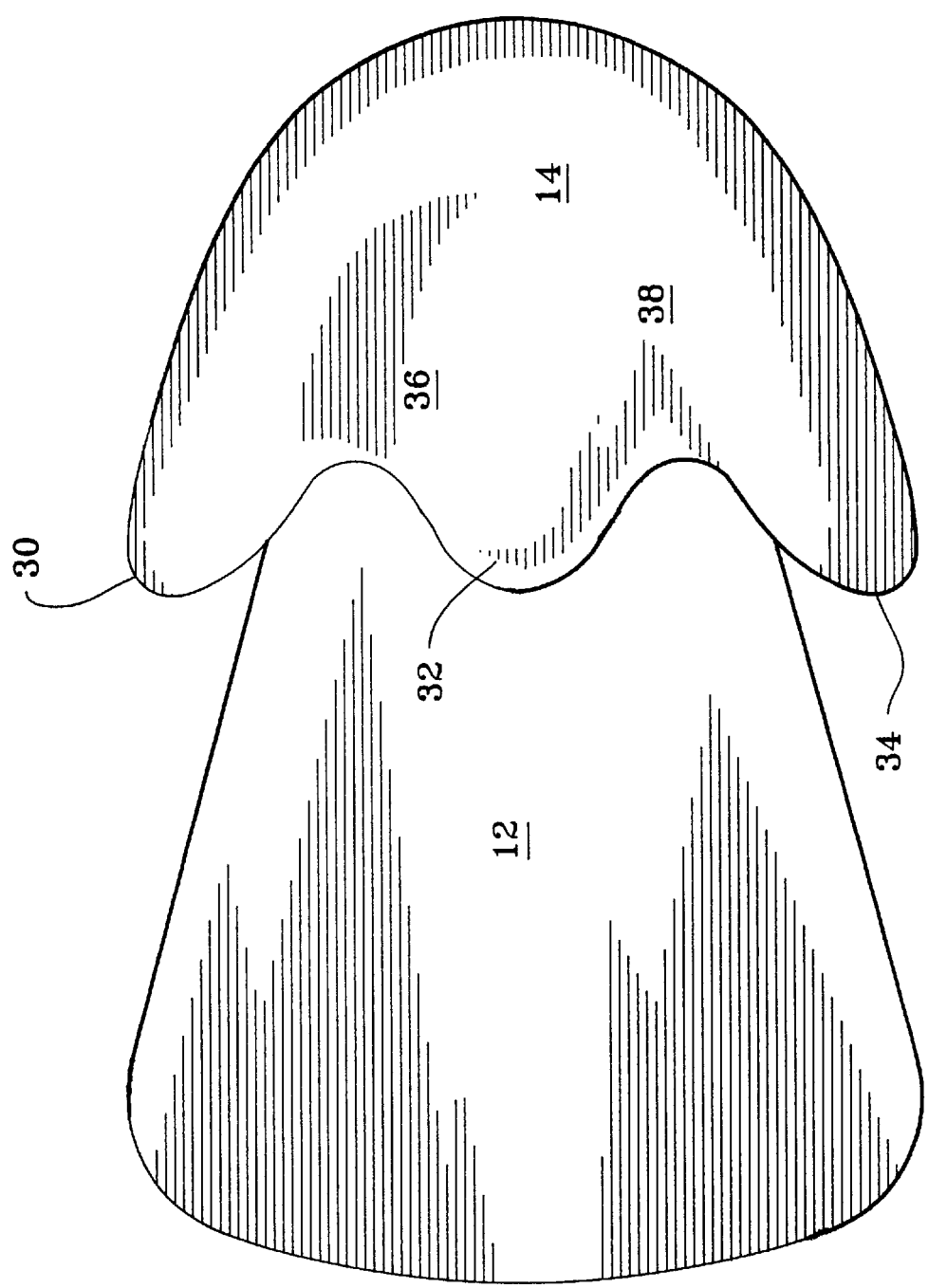

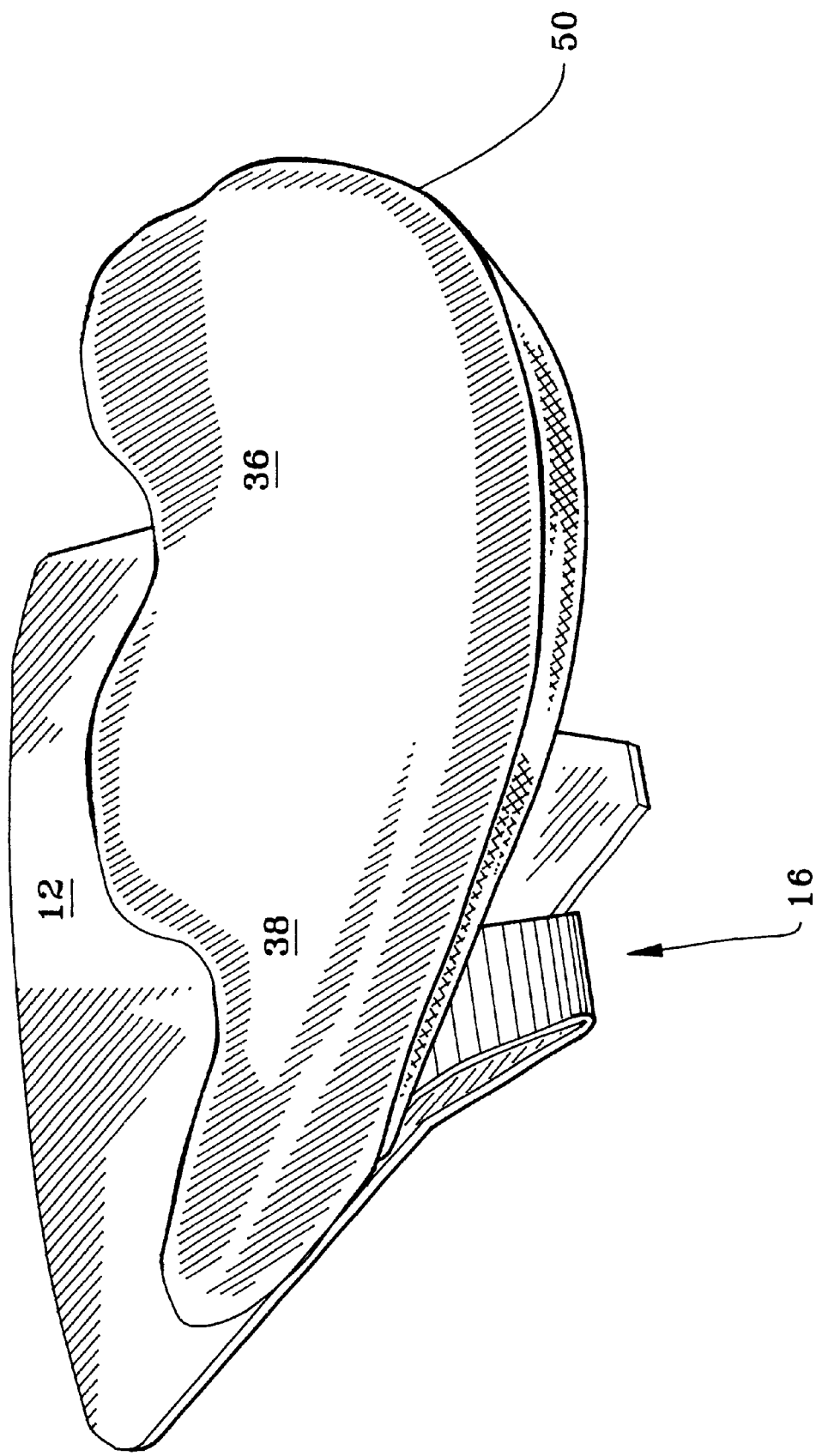

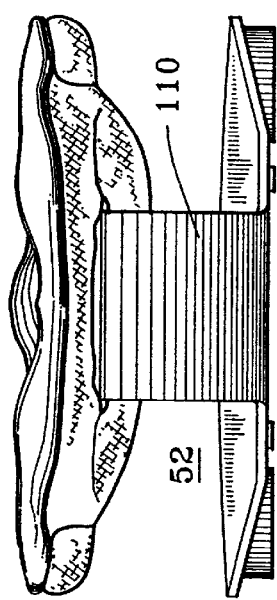
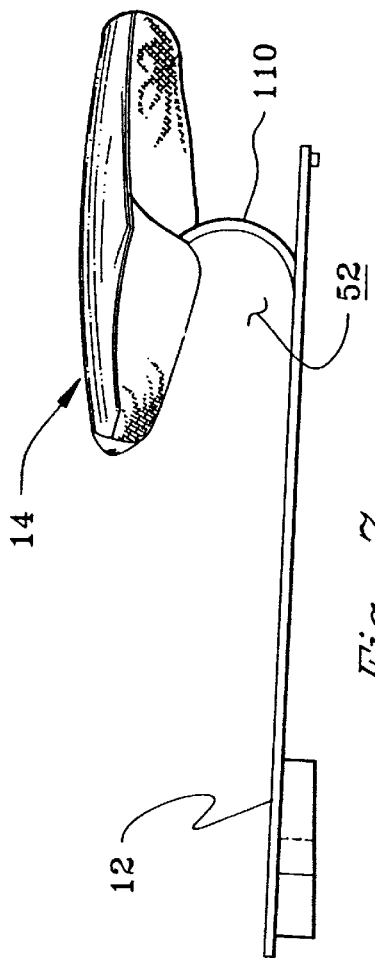

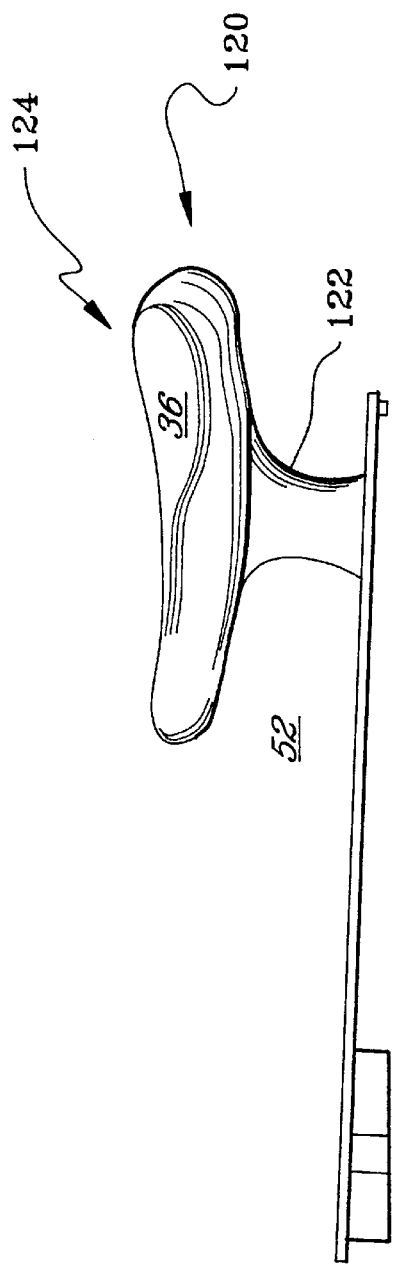
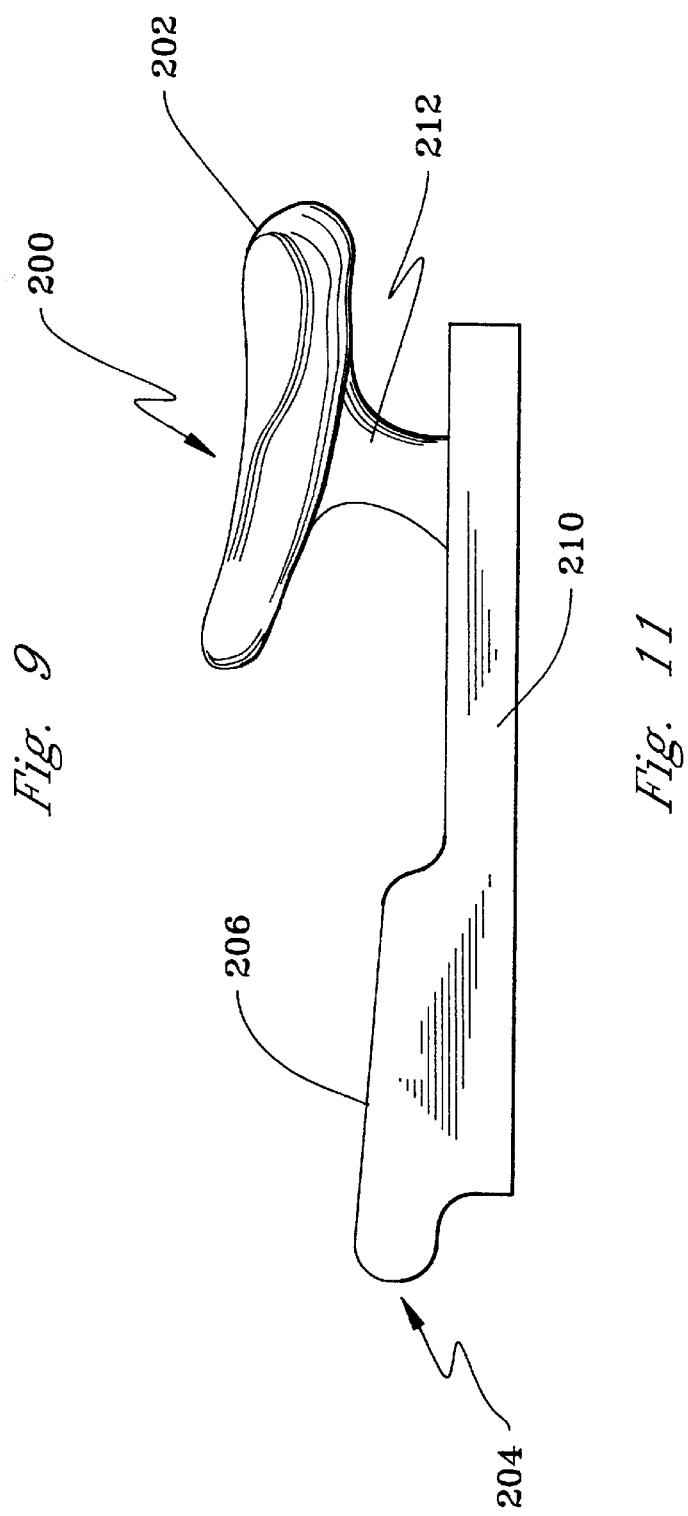

ERGONOMIC LOWER ARM SUPPORT REST

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The invention relates to ergonomic support members for the wrist or lower arm. While the invention will find particular application to use by those manipulating or entering data on computers, it is also useful in any environment wherein a user must perform repetitive hand actions where numerous movements of the hand(s) are required, especially when the hands are disposed forwardly in front of from the body. For example, many light assembly jobs involve repetitive tasks with the user's hands disposed in front of the body. In such environments, repetitive strain injuries occur when the same motion is repeated hundreds or thousands of times each day. While there are many possible causes of a particular person's malady, one form is often occasioned when the worker repeatedly pronates the wrists and hands, or maintains them in a (relatively) pronated position.

It is to be understood that the invention will be primarily described in the environment of a computer user; however, the beneficial use of the present invention should not be considered so limited. The present invention may be used in any number of different office or industrial environments, such as 10-key adding machines, controllers of factory machinery, and the like.

Incorrect hand and wrist posture increases the likelihood and severity of repetitive strain injuries. Movements of the wrist such as flexion, extension, abduction, and adduction cause the tendons to be displaced past and against adjacent anatomic surfaces, which causes repetitive strain injuries. Use of a computer keyboard or mouse places the hand and wrist (the "lower arm") in a potentially unnatural position, wherein the wrist may be flexed or deviated side to side, and fingers may be strained. Redesign of the keyboard or mouse can be beneficial, but furthermore, not all users are in the at-risk group or willing to pay the higher cost of ergonomically redesigned components. Therefore, in addition to redesigning data input devices, a device is desired that can be used in conjunction with a conventional data input device such as a computer mouse or keyboard. While relieving the physical strains encountered by some users, is desirable. Such devices will preferably reduce fatigue and increase comfort, thereby increasing productivity and job satisfaction.

The cost of repetitive strain injuries, such as Carpal Tunnel Syndrome, is enormous, not only in medical claims but in lost time and retraining expenses. To a large extent, such injuries are often preventable if correct arm/wrist/hand posture is maintained by the worker. It is believed that a large portion of such injuries are at least in part the result of prolonged flexing and relative "pronation" of the worker's wrists--that is, with the hands held in front of the body, rotation of the wrists such that the thumbs rotate downwardly and the palms face downwardly toward the floor. Conversely, with the thumbs rotated relatively upwardly from a horizontal plane, and the palms slightly inwardly, the hands/wrists are relatively more "supinated", a more ergonomically pleasing position that relieves stress to tendons, ligaments and other anatomical structures, and is therefore less likely to result in repetitive stress injuries.

The prior art devices have fallen into two broad categories: devices upon which the wrist or butt of the hand is rested while typing at a computer keyboard, or devices used in conjunction with computer mice to support the palm or wrist of the user. Wrist and arm supports have been developed that consist of an elongated pad typically positioned along and adjacent to the front of, for example, a keyboard. Such rests help to relieve posture and stress related injuries of keyboard users by supporting the wrist in a fixed position relative to the hand and arm so that the degree of bending at the wrist is decreased, this decreasing the stress caused by repetitive motion.

Such devices have been used with trackballs, joysticks, pens, and pointing devices, which vary relative to their shape, ergonomics and the means of converting tracking movement of the device to movement of a cursor on a computer screen. These characteristics determine the amount of space needed to use the pointing device, the intuitiveness of the device, as well as the time required to perform a pointing task. Greater intuitiveness in directing a cursor motion via the manipulation of a pointing device can decrease the time to achieve a comfortable skill level with an unfamiliar pointing device and can result in quicker target acquisition speed. The increasing use of graphical user interfaces such as Microsoft Windows (TM) has resulted in a dramatic increase in the utilization of computer pointing devices, with a consequent increase in repetitive strain injuries associated therewith.

More information about this syndrome is available in "The Handling of an Epidemic," published in *Working Woman*, February 1993, pp. 60–65, which is hereby incorporated by reference. For information on ergonomics in the workplace, see "Video Display Terminal Ergonomics," published in *Professional Safety*, June 1992, pp. 32–39, which is also incorporated herein by reference.

The prior art illustrates a number of approaches to solving the problem of repetitive strain injuries. U.S. Pat. No. 5,340,067 discloses an apparatus for retaining a computer mouse securely within the device, which is molded to fit the user's fingers, palm and wrist. Likewise U.S. Pat. No. 5,562,270 discloses a wrist support for use with both a computer keyboard or mouse. When used with a mouse, the mouse is manipulated on a base member of the device while the wrist of the user rests on a pedestal.

U.S. Pat. No. 5,398,896 discloses an apparatus for use in conjunction with a computer keyboard, wherein the palms of the user's hands rest in supports which travel across the computer keyboard. Likewise, U.S. Pat. No. 5,203,527 discloses a stationary wrist rest device positioned across the base of the entire keyboard upon which a typist can rest his/her wrists during use of the keyboard. U.S. Pat. No. 5,131,614 discloses a wrist support for alleviating strain from use of a mouse, comprising a pad extending along the front of a keyboard upon which travels the mouse.

U.S. Pat. No. 5,131,614 discloses a wrist support for alleviating some of the posture and stress related problems associated with the use of computer mice. The wrist support comprises a longitudinal pad in front of the keyboard and base that rests on a desk or other support surface. U.S. Pat. No. 5,433,407, commonly owned, discloses a cantilevered palm rest having a hand support section, a platform section and a connector to the base. A space is provided between the palm rest and the base so that a mouse or pointing device can be positioned therebetween during use.

However, none of the prior art devices provides the user with the effect of an internal dynamic suspension that increases the uniformity of support throughout the expected range of use-any relative movement between the hand and device is effected by the hand alone.

A device capable of dynamically following the working motions of the lower arm would alleviate stress placed on the lower arm and would result in less fatigue and fewer injuries. Additionally, such device would support the user's hand and follow the natural movement of the hand and fingers as they flex, extend, contract, etc. in order to manipulate a work piece. For example, when using pointing devices: as the pointer is moved away from the body, the hand tends to flatten and the fingers move down relative to the wrist, which moves up relative to the fingers; as the pointer is moved toward the body, the hand tends to ball up, with the fingers moving up relative to the wrist and the wrist moving down relative to the fingers. Repeated movement of the fingers and wrist in this fashion results in a forward-to-rearward rocking of the hand. If the palm, palm/wrist or palm/wrist/arm rest is not capable of dynamic movement in response to this hand movement, then greater strain of the movement is born by the hand, more particularly by the wrist, and access to the pointing device is diminished.

In response to these observations, the present invention may be used in conjunction both with devices for data entry into, or pointing devices used with, for example, computers, or with other industrial processes or using a writing instrument such as a pen. There is a need for a device which ergonomically supports the user's hand or wrist and retains a work piece (a mouse, pointer, 10-key adding machine, etc) to be manipulated by the user's hand. Such device should permit a normal rocking motion of the hand and wrist, while at the same time providing sufficient lateral support to the user's hand and/or wrist that undesired flexing and pronation of the wrist is reduced or eliminated.

BRIEF SUMMARY OF THE INVENTION

The invention is an apparatus for reducing or eliminating the repetitive stress injuries commonly experienced in many office or industrial environments, especially (but not exclusively) in conjunction with computer data entry or pointing devices. The apparatus of the present invention comprises, in its broadest embodiment, an ergonomic lower arm suspension enabling a user to effect forward and rearward rocking motion of the hand when engaged with the apparatus. The lower arm suspension may be considered as an entity independent of means of relating to a workplace or cofunctional components or work pieces. As an application of the invention and as a means of describing its application, the lower arm suspension may have a "support base member" herein understood to be the component supporting the lower arm suspension, and can be, for example, a planar base upon which rests a computer pointing device such as a mouse, or it may be a sork space containing articles to be manipulated by the user. The support base may be merged with the lower arm suspension, or they may be connected by a connecting portion that may or may not contribute to the dynamics of the lower arm suspension. It is to be understood that in the context of this invention, the phrase "lower arm" is to be read to include the forearm, the wrist and the hand, either singly or in combination. That is, the device in its broadest embodiment may be constructed to support just the palm of the hand, the wrist and hand, or the forearm, wrist and hand. The drawings herein are intended to represent any of these embodiments even though they may not illustrate each individually.

The lower arm support suspension is constructed in a manner that enables relative supination of the lower arm while inhibiting relative pronation of the lower arm (as defined above).

In one embodiment of the invention there is provided a connecting portion comprising one or a plurality of tensioned members affixed to a rearward portion of the support member, biased upwardly and forwardly so as to create a space to permit work pieces to be disposed therebetween. The forward-tensioning of the connecting portion permits the spring action necessary to permit the forward-rearward rocking action. A preferred embodiment comprises three tensioned members, with the heel of the hand fitting between a first pair of the members, and the base of the thumb positioned on an opposite side of the device between a second pair of the members. In an additional embodiment of the invention, the connecting portion comprises a single tensioned member supporting a contoured rigidly deformable foam support apparatus. In another embodiment the base may be mobile by sliding on a working surface or by other means of relative mobility as on rails, tracks, wheels or other means of mobility.

In a still further embodiment, either a fixed or mobile lower arm suspension may be integrated into the work piece with no intermediate connecting portion, with a rigid connecting portion, with an adjustable connecting portion, or with a flexibly connected portion.

Accordingly, it is an object of the present invention to provide an apparatus effective in eliminating the repetitive stress injuries commonly associated with many office or industrial jobs. The inventive features of the invention will be set forth in greater detail below.

BRIEF DESCRIPTION OF THE SEVERAL VIEWS OF THE DRAWINGS

The foregoing object and many of the features and advantages of the invention will be apparent from the following more particular description of the various embodiments of the invention, as illustrated in the accompanying drawings in which like reference characters refer to the same parts throughout the different views. The emphasis of the drawings should be placed upon illustrating the principles of the invention rather than on the specific physical characterization.

FIG. 2 is a top plan view of a preferred embodiment of the present invention;

FIG. 3 is a perspective view of the preferred embodiment of FIG. 2;

FIG. 7 is a side view of a second embodiment of the present invention;

FIG. 8 is an end view of the embodiment of FIG. 7;

FIG. 9 is a side view of a third embodiment of the present invention;

FIG. 11 is a side view of the embodiment of FIG. 10.

DETAILED DESCRIPTION OF THE INVENTION

Figure 1A:
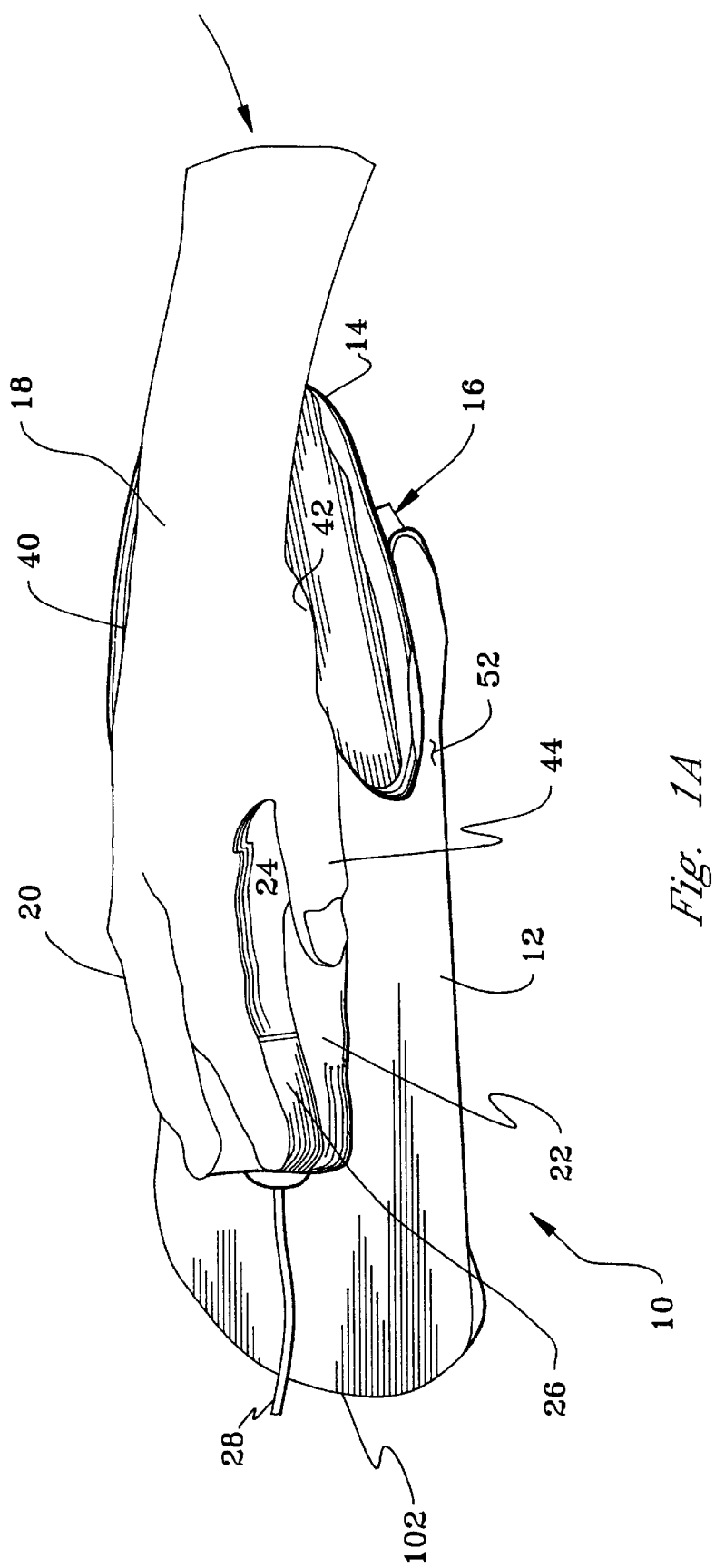
FIG. 1A is a perspective view of the apparatus of the present invention while in use with the fingers fully extended.
Figure 1B:
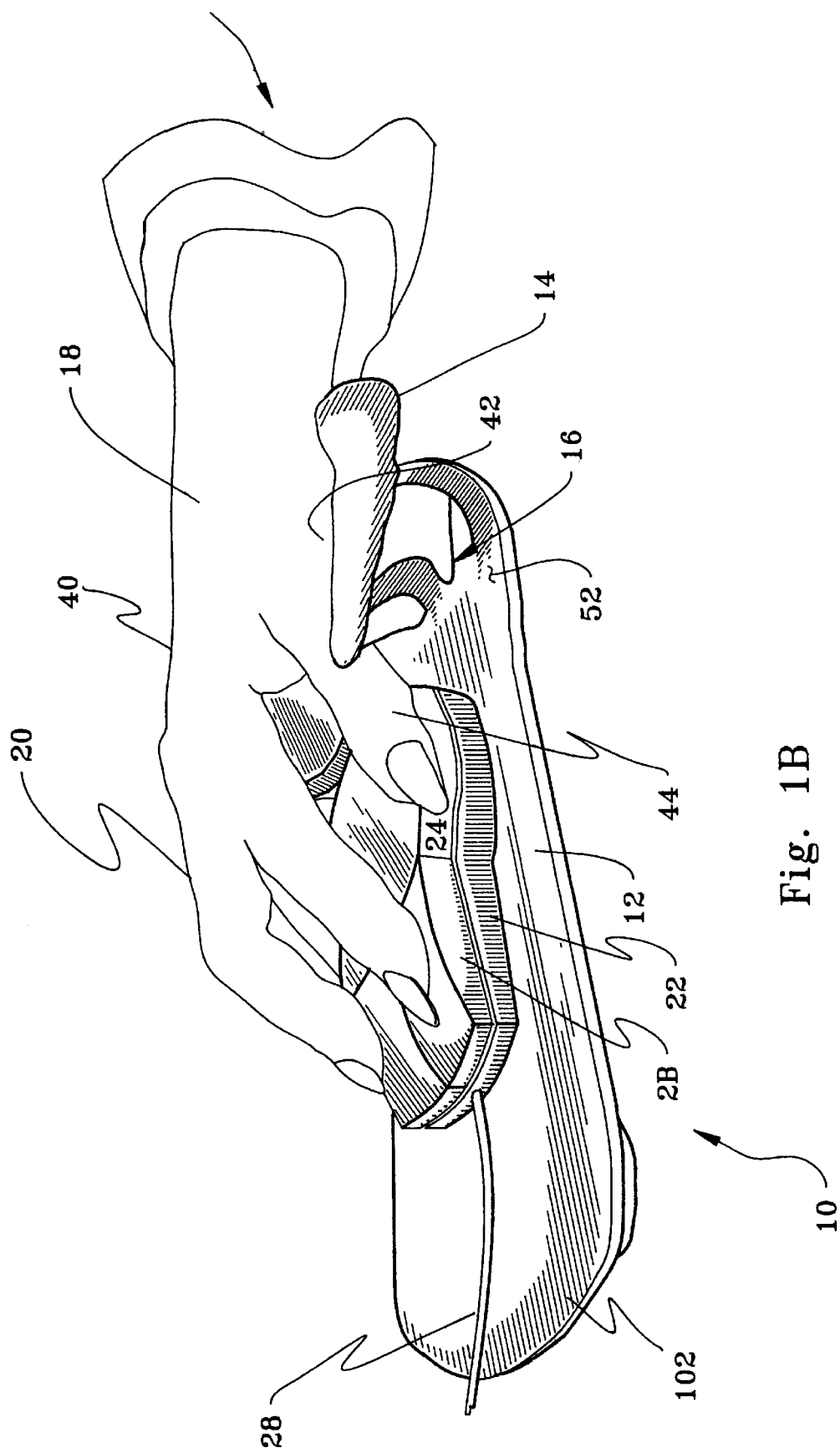
FIG. 1B is a perspective view of the apparatus of the present invention while in use with the fingers contracted.

FIGS. 1A and 1B illustrate a first embodiment of the present invention, wherein the device, generally designated 10, comprises a planar support member 12, a lower arm suspension 14 and a connecting portion 16. As illustrated in FIG. 1, the user's hand and wrist 18 is supported by the device 10, with the user's fingers 20 manipulating a mouse or pointing device 22 (hereinafter "mouse"). As noted above, it is to be understood that the device of the present invention may find as one application use with computer data entry or pointing devices as illustrated herein, but the device is not to be so limited. The environment of FIG. 1 is merely one of many possible applications of the device, none of which materially change the form or function of the apparatus of the invention, however such other uses will not be illustrated or described in great detail hereafter. It should be appreciated that the device is equally applicable to any of these alternative use environments. Additionally, it is to be understood that while the device illustrated herein is depicted as a stationary device, such devices may be adapted to move about the work surface, as will be apparent to one of ordinary skill in this art.

As illustrated in FIG. 1, a mouse 22 is conventionally provided with a contoured body portion 24 adapted to interfit with the fingers or within the palm of the user's hand, and one or more actuating buttons 26. A power cord 28 may interconnect the mouse to a C.P.U. (not shown). Desirably, the base support member 12 is a planar member and is provided with a friction surface so that upon engagement with the actuator means (such as a roller ball) within the mouse 22, sufficient friction exists to induce multidirectional rotation of the actuator means.

In FIG. 1A, the fingers of the user's hand are fully extended, which, relatively speaking, causes the fingers to be lowered and the wrist to raise. When it is desired to move the pointer the mouse 22 may be moved toward the user's body (FIG. 1B), thereby raising the fingers and lowering the wrist. From a "neutral" position, the movement resulting in FIG. 1A causes the front 29 of wrist rest 14 to move downwardly, while the movement resulting in FIG. 1B causes the front of rest 14 to move upwardly. Concurrently, the rear 31 of the wrist rest will be moved oppositely from the front: it will be disposed down when the front moves up, and it will move upwardly when the front moves down—the "rocking" motion described herein. Therefore it can be seen that the device is especially adapted to follow the working motion of the lower arm during use, while at the same time providing proper ergonomic posture.

As graphically represented in FIG. 2, in a preferred embodiment the lower arm suspension 14 of the present invention is provided in the form of a "cushion" with three lobes 30, 32, 34 contoured to create a pair of depressions 36, 38. When viewed with FIG. 1, and when used to support the right hand and wrist of the user, the heel 40 of the user's right hand nestles into the depression 36 while the base 42 of the user's right thumb 44 nestles within the depression 38. Lateral movement of the user's hand is thereby restricted after engagement within the depressions 36, 38. If desired, the depression 36 may be relatively lower than the depression 38 so as to permit the natural relative supination of the hand to be maintained.

Figure 4:
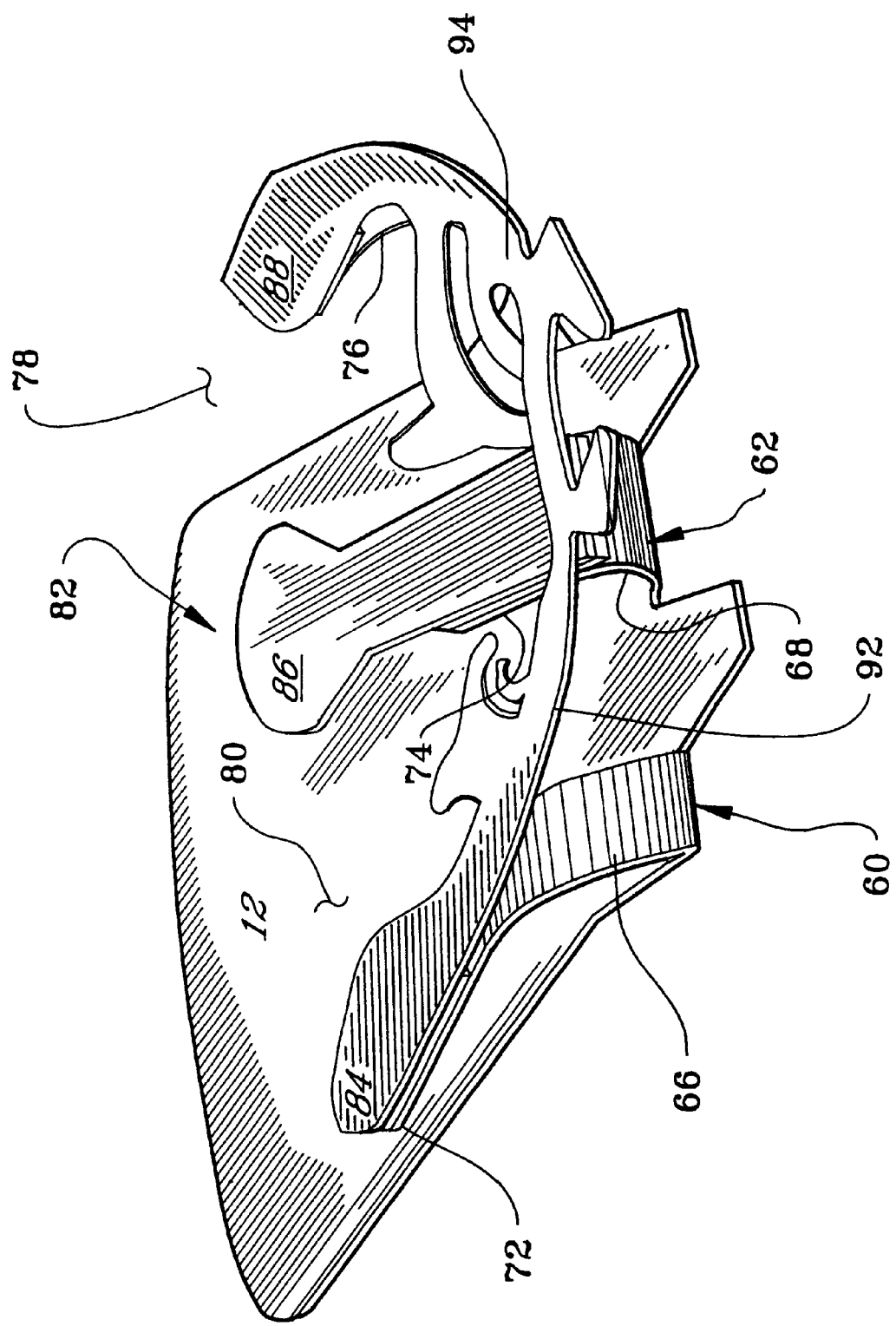
FIG. 4 is a perspective view of one method of forming the inner structure of the embodiment of FIG. 2.
Figure 5:
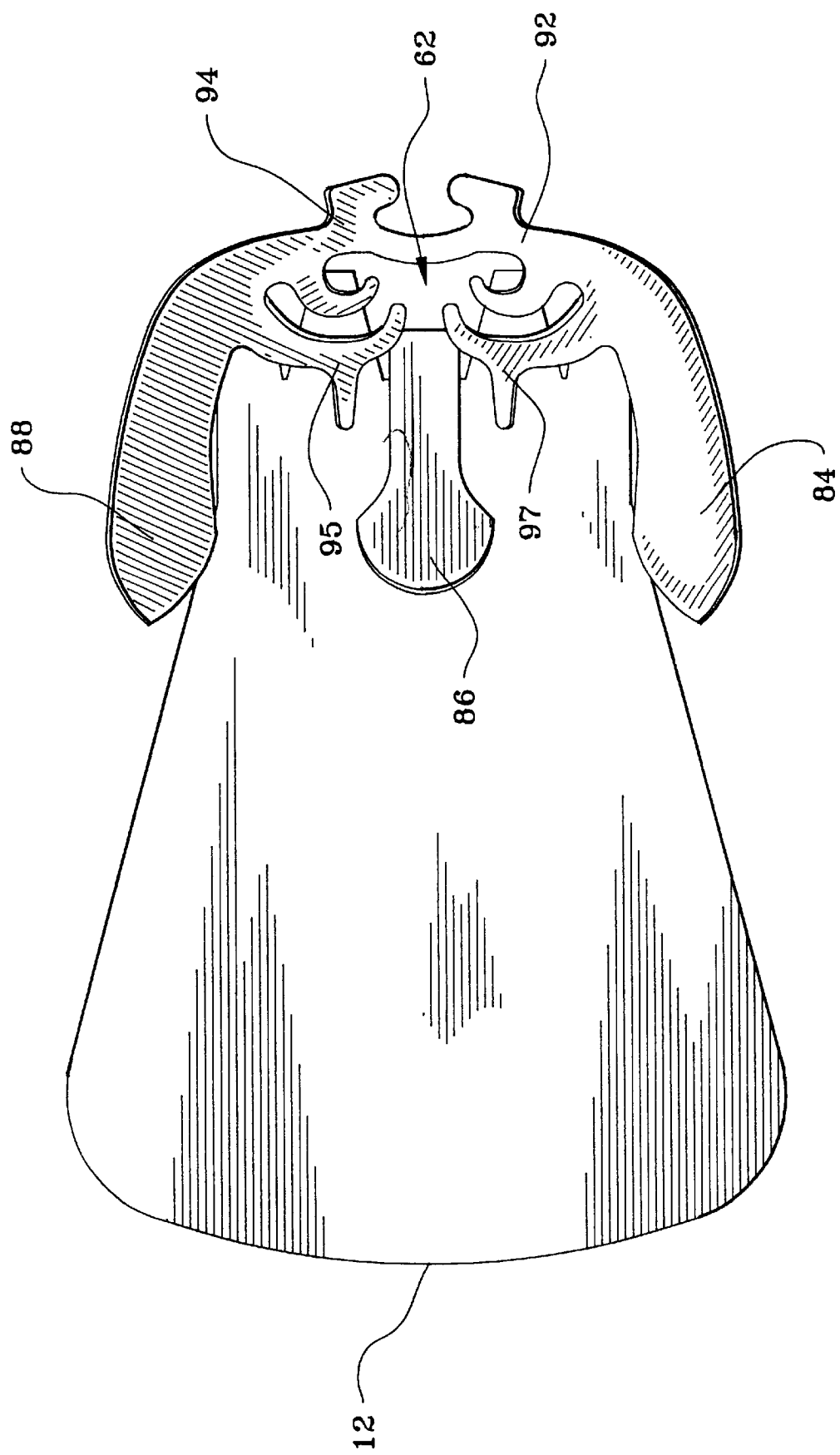
FIG. 5 is a top plan view of the embodiment of FIG. 7.

While the present invention does not require a specific method of providing additional comfort to the user, Applicant has found that by providing foam-type padding additional comfort for the user is achieved and results in greater likelihood of use. A removable cover 50 may be affixed. One of the critical features of the present invention is the capacity of the apparatus to bend or deform so as to follow the dynamic articulation of the user's lower arm (wrist and hand), while at the same time supporting the hand in an ergonomically correct posture. Such deformation is advantageous to accomplish the expected tasks to be performed during use of the apparatus, and can enable not only the action of the user's hand, but also the action of the apparatus 10. To effect this bending, resilient means must be provided which are capable of deflection. Accordingly, in one embodiment of the invention the connecting portion comprises a plurality of tensioned members 60, 62, 64. As illustrated in FIG. 4, these tensioned members comprise the connecting portion, and may be provided as a portion of the base support member 12 from the rear 31 of the member bent upwardly 66, 68 and 70 respectively. In the embodiment illustrated, the connecting portions 66, 68 and 70 are then provided a relatively short distance generally parallel with the plane of the base support member 12 (or "forward" in the embodiment illustrated herein) as lower arm support members 72 and 76 respectively. The center lower arm support member 74 is canted at an angle (approximately 40 degrees) in order to create ergonomically correct support depressions for the user's hand. In this embodiment, if the base 12 is made of suitable material (such as suitable metal having appropriate tensile properties, or injection-molded plastic) the individual portions 66/72, 68/74 and 70/76 function as a suspension and may act as "springs" and provide resilient deformation in a plane perpendicular to the plane of the base member 12. When finished, there is provided a space 52 (FIG. 7) between the base member 12 and the lower arm suspension 14, so that a work piece (either the mouse 22 or other member to be hand manipulated) may be moved beneath the suspension 14 if necessary to perform the desired action.

The troughs or depressions 36, 38 of FIG. 2 are created by the gaps 78, 80 between adjacent portions 74–76 and 72–74 respectively, and by the shape of foam or other padding over resilient means 82. Applicant has found it advantageous to provide further deformable resilient means 82 interconnecting the portions 72, 74 and 76. For example, a contiguous strand of a plastic support means comprising portions 84, 86 and 88 overlying the portions 72, 74 and 76 respectively, interconnected by webs 92, 94 further enhance the rocking or bending motion of the device. As illustrated, the center portion 74 may be provided at a more severe acute angle (such as approximately 40 degrees) to the base portion 12 than are the other portions 72, 76, thereby enhancing the depressions 36, 38 in the support cushion of the suspension 14. The center portion 74 then fits within the center of the palm of the user's hand.

When used in an ambidextrous mode, the device of FIG. 1 is constructed such that the palm of either hand may interfit with the depressions 36, 38 of the cushion on suspension 14. However, if the device is manufactured solely for right-hand or left-hand use, and if greater freedom of use with the supported hand is desired (particularly in the degree of extension of the user's thumb and adjacent fingers), one of the outer lobes 30, 34 may be substantially truncated to permit the user's thumb greater movement, while still supporting the heel of the user's hand with the other lobe. For example, in the example of FIG. 1, the lobe 34 of cushion of the lower arm suspension 14 (together with the lower arm support member 72 and portion 84) may be shortened in size by truncating the members 72, 84. The webbing 92 may then be affixed to the truncated connecting portion 66, while the heel of the user's hand is supported within depression 36 (FIG. 3). The opposite may be effected for use solely with the left hand.

While Applicant has found it advantageous to construct the base 12 with metal and the overlay (84–88 and 92, 94) of plastic, it is to be understood that the materials of construction are not critical to the operation of this device, and that the materials chosen will be within the skill of one of ordinary skill in this art depending on the attributes desired and the cost parameters within which the device is manufactured. The webs 92, 94 provide support for an overlayment of padding (not shown), while at the same time being sufficiently deformable to enable the necessary rocking action of the user's hand. If sufficiently rigid padding or underlayment is utilized, the overlay 84–88 and webs 92, 94 may be eliminated.

When the movement of FIG. 1A is effected, it is apparent that the suspension of FIG. 4 adjusts to provide dynamic support to the user's hand. As the fingers extend (and move relatively downwardly), the user's palm presses against member 86, while the wrist raises and eases engagement with members 92, 94. Conversely, during the movement of FIG. 1B, the fingers raise (easing engagement with member 86), while the wrist is lowered into greater engagement with members 92, 94. Throughout this movement, the heel 40 of the user's hand is engaging web member 95 while the base of thumb 42 engages web member 84.

Figure 6:
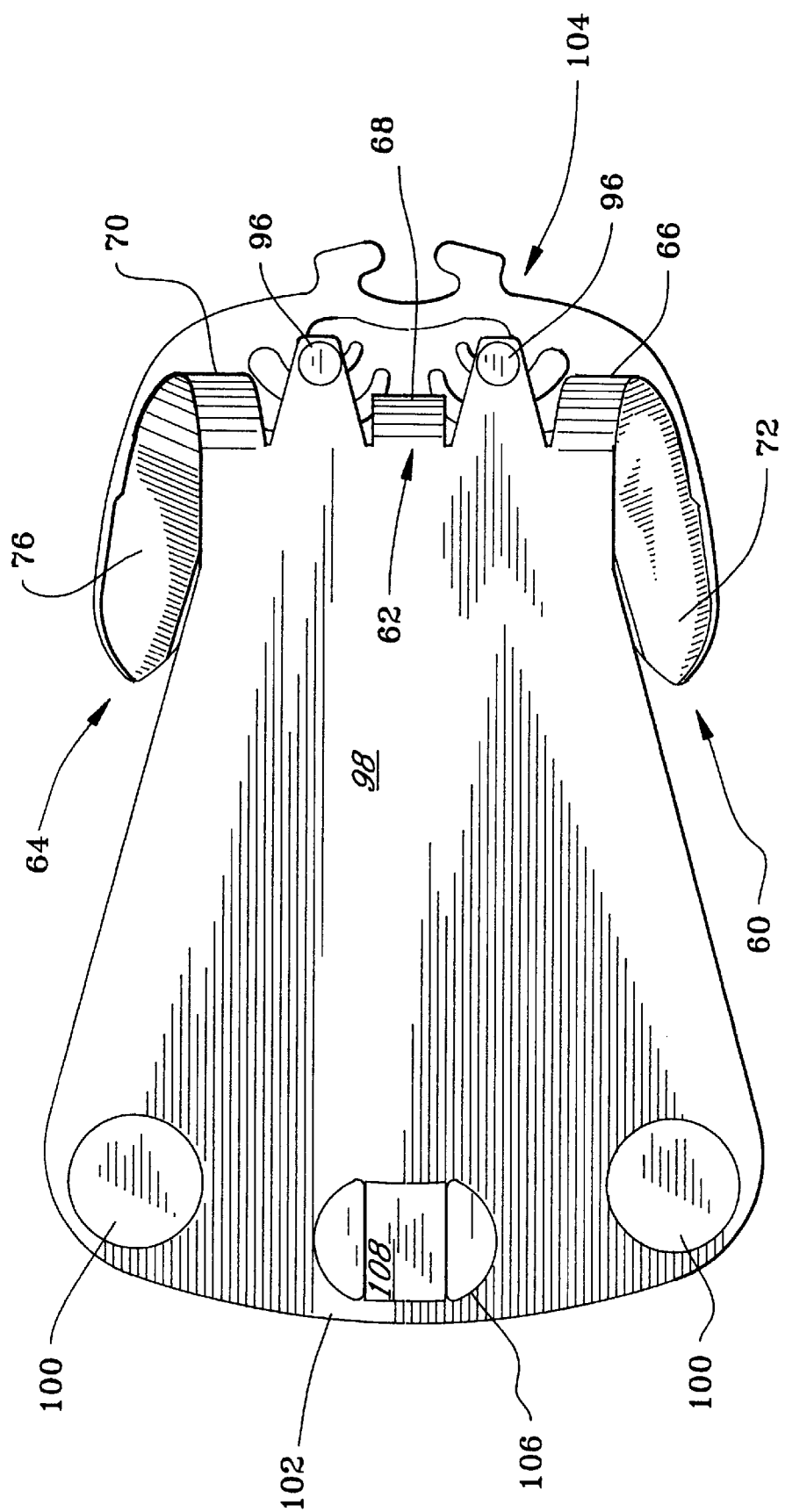
FIG. 6 is a bottom plan view of the embodiment of FIG. 7.

As illustrated in FIG. 6, the underside 98 of the base member 12 may be provided with pads or other members which provide frictional engagement between the device and the surface upon which it rests, and provide resiliency thereby relieving stress to the user's fingers. Such pads may also be used to cant the device by raising one end above the other end. For example, relatively small pads 96 may be provided at one end on the underside 98 of base member 12. At the other end 102 of base member 12 relatively larger, thicker pads 100 may be provided, thereby raising the "front" end 102 of device 10 over the other, or "rear" end 104 of the device. If desired, one pad 106 may be provided with an aperture 108 to retain the power cord 28.

While Applicant has illustrated a preferred embodiment in FIGS. 1–6, the embodiment of FIGS. 7 and 8 is illustrated with a single "post" or ribbon 110 rather than the plurality of members 66–70 of FIGS. 1–6. This embodiment provides the same sort of spring action to permit the forward-rearward rocking action desired in this device.

When one forms a right angle at the elbow, with the upper arm hanging vertically and the lower arm horizontal to the ground, the palm of a typical person's hand will be rotated at an angle to the horizontal. Most work places provide a flat (horizontal) work space—such as a computer keyboard or light assembly line that is above or below the level of the worker's elbow. Therefore, when working at such a workplace, the worker must flex and slightly pronate the hands, that is, rotate the hand at the wrist or the entire lower arm at the elbow, in order to place the plane of the hand in the plane of the work place. This flexion and pronation are often markedly increased with the grasping or opertion of a work piece. Such relative flexion and relative pronation is one cause of repetitive stress injuries. One of the attributes of the present invention is that, with the heel of the hand nestled into the support member, it will support the hand to maintain the wrist in the proper position, thereby reinforcing the natural supination of the hand during work activities.

It is to be understood that the device of the present invention is not necessarily limited to any particular physical embodiment not required by the broadest claim hereinafter. Accordingly, an alternative embodiment is illustrated in FIG. 9 wherein a single block of a deformable foam or plastic material 120, is constructed (such as by injection molding), having a pedestal or post 122 and a hand/wrist support portion 124. The portion 124 is advantageously formed with depressions 36, 38, much in the same manner that the lower arm suspension 14 is provided in FIGS. 1–8.

Figure 10:
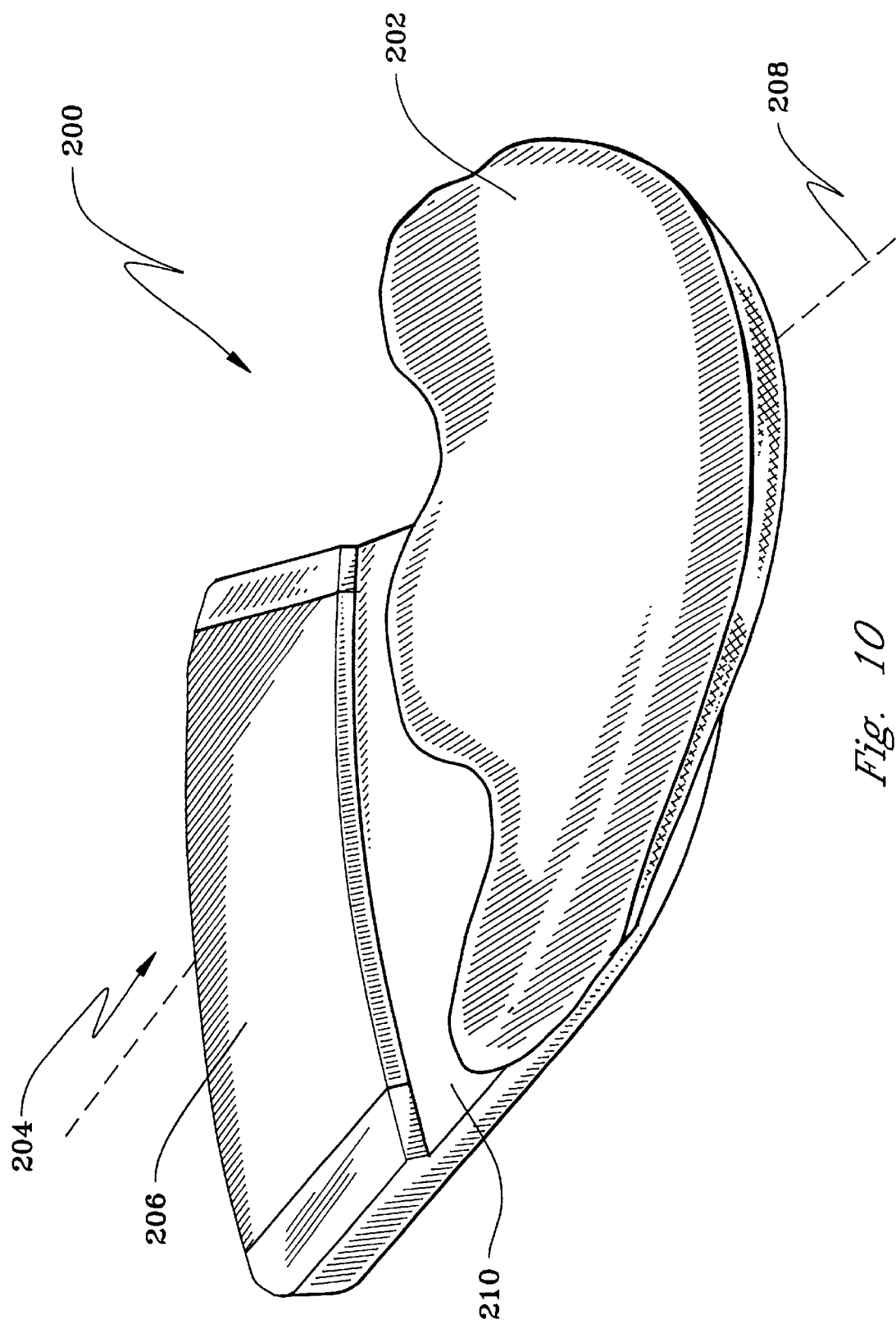
FIG. 10 is a perspective view of an embodiment of the present invention incorporated into a touch pad device.

Turning now to FIG. 10, the apparatus 200 comprises a lower arm suspension 202 integral with the work piece. In this embodiment, the work piece (as illustrated in FIG. 10 the work piece is a data input device such as pointing device 204) and the base support member are one and the same—the work piece does not function independently of the base support as in the embodiment of FIG. 1. The pointing device of FIG. 10 comprises a data input device such as touch pad 206 wherein the user's fingers touch various positions on the touch pad screen in order to move the pointing device. As with the prior embodiments, as the user's fingers are moved longitudinally along axis 208 to reach farther or nearer points on the screen, the user's hand will rock as described above. The suspension 202 will conform to this hand motion to provide continuous dynamic support throughout the range of hand movement.

The side view of FIG. 11 illustrates the unitary nature of the device, wherein the lower arm suspension 202 is incorporated into a support base member 210 which also comprises the pointing device 204. As illustrated, the pedestal 212 interconnects member 202 to base 210.

In a still further embodiment, the invention may comprise a base member movable relative to the work surface upon which it is placed, and having a portion thereof removed with a data entry device (such as a pointing device) positioned therein and movable on the work surface within the outer periphery of the base. The data entry device is operatively interconnected with either the base member or the lower arm suspension.

The invention has been illustrated and described herein with a lower arm suspension rigidly affixed to the base member. It is to be appreciated that the advantageous of the invention will be available if these two features are provided independent of one another, so that the lower arm suspension can move or rotate independently of the base member. For example, in the embodiment of FIGS. 10 and 11, the touch pad 206 and a portion of the base support member 210 may be movable independently of the pedestal 212 and lower arm suspension 202. Additionally, there is no requirement that the base support member be rigidly secured to the work surface—it may in fact be adapted to move thereon, or on tracks or other means of mobility, to more dynamically follow the working motions of the user's lower arm. The device disclosed herein may be used in conjunction with or integrated with a mouse, a trackball, a touch pad, or other computer or office machine peripherals, such as a computer keyboard, 10-key adding machine, and the like, or other industrial application.

While the invention has been particularly shown and described with references to preferred embodiments thereof, it will be understood by those skilled in this art that various modifications and changes can be made to the disclosed embodiments without departing from the spirit and scope of the invention. Accordingly, the scope of this invention should be limited only by the scope of the appended claims.

I claim:

1. An apparatus for use with a computer pointing device, comprising:
   (a) a base that includes a front area, a rear area, and an upper surface, wherein the upper surface is adapted for the computer pointing device to rest thereon;
   (b) a lower arm suspension member made from a material able to bend or deform to follow articulation of a lower arm, and having padding or cushioning material covering the lower arm suspension member and having flexibility to support hand movement; and
   (c) three tensioned connecting members rigidly attached to the base and flexibly attached to the lower arm suspension member to flexibly connect the lower arm suspension member to the base.

2. The apparatus of claim 1 wherein the padding or cushion element of the lower arm suspension member is contoured to form a pair of depressions formed in a user's hand.

3. The apparatus of claim 1 wherein the base has a frictional surface.

4. The apparatus of claim 1 wherein the lower arm suspension member forms three lobes in a front-ward direction.

5. The apparatus of claim 1 wherein the connecting member is attached to the base in a rearward direction.

6. A lower arm, wrist and palm support apparatus, comprising:
   (a) a lower arm suspension member made from a material able to bend or deform to follow articulation of a lower arm, and having padding or cushioning material covering the lower arm suspension member and having flexibility to support hand movement; and
   (b) three tensioned connecting members rigidly attached to a base and flexibly attached to the lower arm suspension member to flexibly connect the lower arm suspension member to the base.

7. The apparatus of claim 6 wherein the padding or cushion element of the lower arm suspension member is contoured to form a pair of depressions formed in a user's hand.

8. The apparatus of claim 6 wherein the lower arm suspension member forms three lobes.

9. The apparatus of claim 6 wherein the lower arm suspension member forms three lobes in a front-ward direction.

* * * * *